United States Patent
Hiraku et al.

(10) Patent No.: US 7,610,898 B2
(45) Date of Patent: Nov. 3, 2009

(54) APPARATUS AND METHOD FOR CONTROLLING IDLE SPEED OF INTERNAL COMBUSTION ENGINE

(75) Inventors: Keizo Hiraku, Aichi-ken (JP); Noboru Takagi, Toyota (JP); Kiyoo Hirose, Nagoya (JP); Hirohiko Yamada, Okazaki (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 249 days.

(21) Appl. No.: 11/661,097

(22) PCT Filed: Aug. 26, 2005

(86) PCT No.: PCT/JP2005/016058

§ 371 (c)(1),
(2), (4) Date: May 14, 2007

(87) PCT Pub. No.: WO2006/022449

PCT Pub. Date: Mar. 2, 2006

(65) Prior Publication Data
US 2008/0115762 A1      May 22, 2008

(30) Foreign Application Priority Data
Aug. 26, 2004   (JP) ............................. 2004-247149

(51) Int. Cl.
F02D 41/04    (2006.01)
F01L 1/34     (2006.01)
F02D 11/10    (2006.01)

(52) U.S. Cl. ............... 123/339.14; 123/399; 123/90.15
(58) Field of Classification Search ... 123/90.15–90.18, 123/316, 339.11, 339.14, 339.19, 347, 348, 123/361, 399, 403; 701/101–103, 110
See application file for complete search history.

(56) References Cited

U.S. PATENT DOCUMENTS

| | | | |
|---|---|---|---|
| 5,529,031 A * | 6/1996 | Yoshioka | 123/90.15 |
| 5,588,411 A | 12/1996 | Kreuter et al. | |
| 5,720,258 A | 2/1998 | Tolkacz et al. | |
| 6,039,026 A | 3/2000 | Shiraishi et al. | |
| 6,578,534 B2 * | 6/2003 | Nohara et al. | 123/90.16 |
| 7,198,030 B2 * | 4/2007 | Irisawa | 123/399 |
| 2002/0120384 A1 | 8/2002 | Takemura et al. | |
| 2005/0178357 A1 | 8/2005 | Yui et al. | |

FOREIGN PATENT DOCUMENTS

| | | |
|---|---|---|
| DE | 195 01 386 A1 | 8/1996 |
| EP | 1 234 958 A2 | 8/2002 |

(Continued)

Primary Examiner—Willis R Wolfe, Jr.
(74) Attorney, Agent, or Firm—Kenyon & Kenyon LLP

(57) ABSTRACT

An engine has a variable valve actuation mechanism that varies lift characteristics of an intake valve. An idle speed control apparatus has a control section for controlling an intake air amount of the engine in an idle state for adjusting an actual engine speed to a target engine speed. The control section sets a control amount related to control of the intake air amount in correspondence with the lift characteristics, which are varied by the variable valve actuation mechanism. Accordingly, the engine speed in the idle state is effectively controlled in correspondence with changes of the lift characteristics.

13 Claims, 11 Drawing Sheets

FOREIGN PATENT DOCUMENTS

| | | |
|---|---|---|
| EP | 1 234 967 A2 | 8/2002 |
| JP | 2001-263015 | 9/2001 |
| JP | 2002-188473 A | 7/2002 |
| JP | 2002-256930 A | 9/2002 |
| JP | 2004-068767 | 3/2004 |
| JP | 2004-162638 | 6/2004 |

* cited by examiner

Map A

Fig. 11(a) Lift Duration Angle VL
Fig. 11(b) Learning Range
Fig. 11(c) Learning Term Qg
Fig. 11(d) Required Control Amount Qcal
Fig. 11(e) Engine Speed NE Map B Lift Duration Angle VL Compensation Term Qvl Required Control Amount Qcal Engine Speed NE

APPARATUS AND METHOD FOR CONTROLLING IDLE SPEED OF INTERNAL COMBUSTION ENGINE

FIELD OF THE INVENTION

The present invention relates to a control apparatus and method for controlling idle speed of an internal combustion engine, which apparatus and method control an intake air amount adjustment mechanism for adjusting an actual engine speed to a target engine speed in an idle state.

BACKGROUND OF THE INVENTION

Typically, in the idle state, the target engine speed is set and an idle speed control procedure (hereinafter, ISC) is performed in correspondence with the target engine speed. More specifically, the amount of intake air fed to a combustion chamber is controlled by, for example, adjusting a throttle opening degree, in such a manner that the actual engine speed reaches the target engine speed.

Further, engines having a variable valve actuation mechanism that varies lift characteristics of an intake valve, such as opening timing, closing timing, open duration (lift duration angle), lift amount, and the relationship between the crank angle and the lift amount in an open state of the intake valve (lift profile), have been used. These engines improve engine output and maintain exhaust properties by changing the lift characteristics of the intake valve by means of the variable valve actuation mechanism (see, for example, Japanese Laid-Open Patent Publication No. 2001-263015).

However, if the ISC is carried out in these engines, which have the variable valve actuation mechanism, the following problem may occur.

In these engines, the intake valve functions as a restrictor regulating a flow of intake air. The extent of restriction is changed in correspondence with the lift characteristics of the intake valve, such as the lift amount and the open duration (the lift duration angle), which are changed by the variable valve actuation mechanism. This changes pumping loss caused by a throttle valve, leading to variation in response of the intake air amount with respect to changes of a throttle opening degree. The speed at which the engine speed is changed by the ISC is thus varied correspondingly.

Further, in the engines including the variable valve actuation mechanism, the amount of intake air fed to the combustion chamber is adjusted by varying the lift characteristics of the intake valve. This allows the engine to operate at a relatively low output (a relatively low air amount), compared to a case in which the intake air amount is reduced by decreasing the throttle opening degree.

More specifically, compared to the case in which the intake air amount is reduced by decreasing the throttle opening degree, the throttle opening degree is maintained at a relatively high level if the intake air amount is adjusted by changing the lift characteristics of the intake valve. This raises the pressure of the intake air in the intake passage upstream from the intake valve. Therefore, if the amount of intake air fed to the combustion chamber, or the pressure acting in the combustion chamber when an intake stroke is complete, is equal in the two cases, the pressure acting in the combustion chamber before completion of the intake stroke is relatively high in the case in which the intake air amount is controlled through changes of the lift characteristics of the intake valve, compared to the case in which such control is performed through adjustment of the throttle valve. Accordingly, the pumping loss becomes relatively low if the intake air amount is controlled through changes of the lift characteristics of the intake valve, compared to the other case.

However, in controlling of the lift characteristics by the variable valve actuation mechanism, the throttle opening degree (the intake air amount) required for adjusting the actual engine speed to the target engine speed changes in correspondence with changes of the pumping loss. This may vary the speed at which the engine speed is changed by the ISC.

As has been described, the conventional the ISC is not adapted to changes of the engine properties, which are brought about by changes of the lift characteristics of the intake valve. This lowers the control reliability of the engine speed.

SUMMARY OF THE INVENTION

Accordingly, it is an objective of the present invention to provide a control apparatus and method for controlling idle speed of an internal combustion engine, capable of reliably controlling the engine speed in an idle state.

To achieve the foregoing and other objectives and in accordance with the purpose of the present invention, the invention provides an idle speed control apparatus of an engine including a variable valve actuation mechanism that varies lift characteristics of an intake valve. The apparatus has a control section for controlling an intake air amount of the engine in an idle state for adjusting an actual engine speed to a target engine speed. The control section sets a control amount related to controlling of the intake air amount in correspondence with the lift characteristics varied by the variable valve actuation mechanism.

Another aspect of the present invention is an idle speed control method of an engine including a variable valve actuation mechanism that varies lift characteristics of an intake valve. The method includes controlling an intake air amount of the engine in an idle state for adjusting an actual engine speed to a target engine speed. The method further includes setting a control amount related to controlling of the intake air amount in correspondence with the lift characteristics varied by the variable valve actuation mechanism.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An engine idle speed control apparatus according to a first embodiment of the present invention will now be described.

Figure 1:
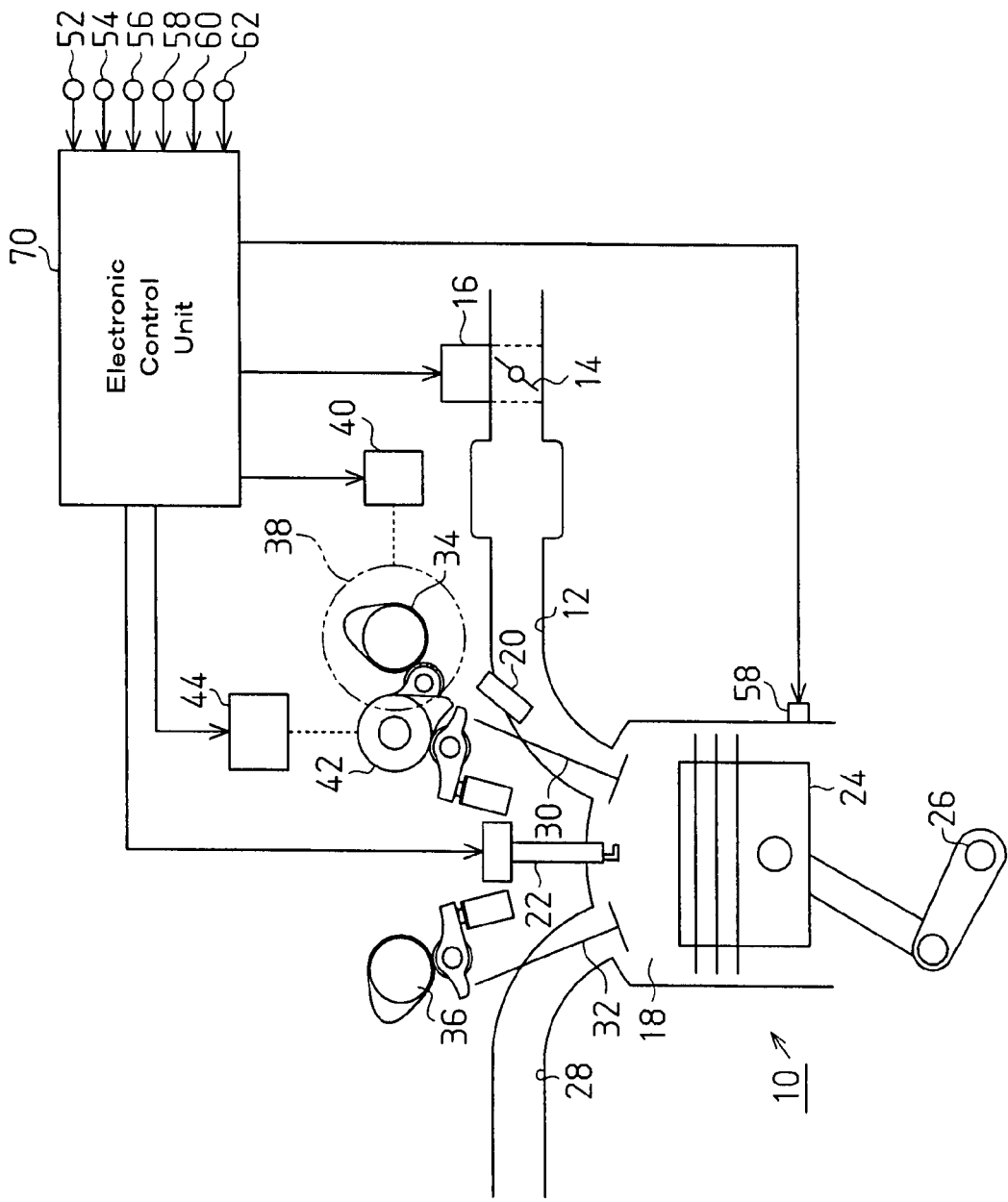
FIG. 1 is a view showing the structure of an idle speed control apparatus according to a first embodiment of the present invention.

FIG. 1 schematically shows the structure of the idle speed control apparatus of the first embodiment.

As shown in FIG. 1, a throttle valve 14 is provided in an intake passage 12 of an engine 10. A throttle motor 16 is connected to the throttle valve 14. The opening degree of the throttle valve 14 (the throttle opening degree) is regulated through actuation of the throttle motor 16, thus adjusting the amount of the intake air fed to a combustion chamber 18 through the intake passage 12. A fuel injection valve 20 is also arranged in the intake passage 12 for injecting fuel into the intake passage 12.

In the combustion chamber 18 of the engine 10, a spark plug 22 ignites an air-fuel mixture of the intake air and the injected fuel. The air-fuel mixture is thus combusted and reciprocates a piston 24, thus rotating a crankshaft 26. The air-fuel mixture is then sent from the combustion chamber 18 to an exhaust passage 28 as exhaust gas.

In the engine 10, the intake passage 12 and the combustion chamber 18 are selectively connected with and disconnected from each other through actuation of an intake valve 30. The combustion chamber 18 and the exhaust passage 28 are selectively connected with and disconnected from each other through actuation of an exhaust valve 32. The intake valve 30 is selectively opened and closed through rotation of an intake camshaft 34 to which rotation of the crankshaft 26 is transmitted. Similarly, the exhaust valve 32 is selectively opened and closed through rotation of an exhaust camshaft 36 to which the rotation of the crankshaft 26 is transmitted.

Figure 2:
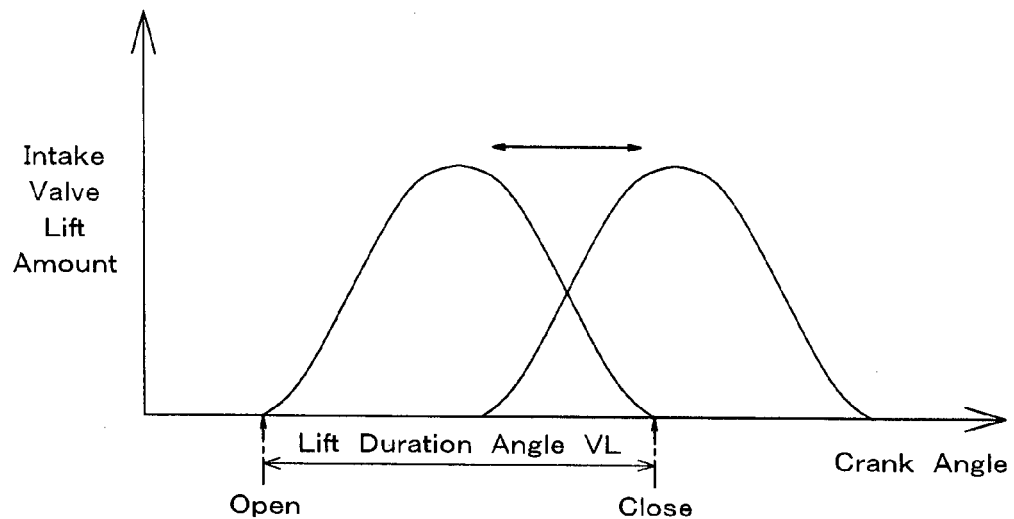
FIG. 2 is a graph representing variation of opening and closing timings in response to actuation of a variable valve timing mechanism of the apparatus of FIG. 1.

A variable valve timing mechanism 38 is provided in the intake camshaft 34. The variable valve timing mechanism 38 adjusts a relative rotation angle of the intake camshaft 34 with respect to a rotation angle (a crank angle) of the crankshaft 26 for selectively advancing and delaying the valve timing of the intake valve 30. The variable valve timing mechanism 38 is operated by controlling hydraulic pressure applied to the variable valve timing mechanism 38 by means of a hydraulic pressure actuator 40. Through operation of the variable valve timing mechanism 38, the valve timing of the intake valve 30 is changed, as illustrated by the graph of FIG. 2. As is clear from the graph, the variable valve timing mechanism 38 advances or delays both of the opening-timing and the closing timing of the intake valve 30, while maintaining the open duration (lift duration angle VL) at a constant level.

Figure 3:
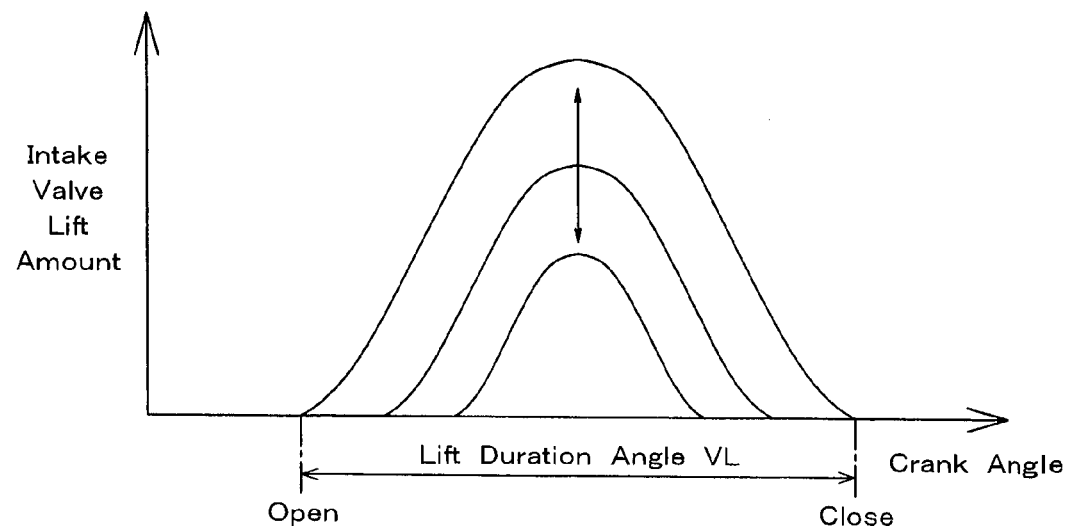
FIG. 3 is a graph representing variation of lift amount and that of lift duration angle in response to a variable lift amount mechanism of the apparatus of FIG. 1.

A variable lift amount mechanism 42 is provided between the intake camshaft 34 and the intake valve 30. The variable lift amount mechanism 42 variably sets a lift amount of the intake valve 30 and is actuated by an electric motor 44. The lift amount of the intake valve 30 is changed by the variable lift amount mechanism 42, as illustrated by FIG. 3. As is clear from the graph, the lift amount (more specifically, a maximum lift amount) and the lift duration angle VL of the intake valve 30 change correspondingly. That is, for example, as the lift amount becomes larger, the lift duration angle VL becomes greater. If the lift duration angle VL increases, the time lag between the opening timing and the closing timing of the intake valve 30, or the open duration of the intake valve 30, is prolonged.

In the first embodiment, the intake air amount is adjusted by performing a control procedure of the opening degree of the throttle valve 14 (a throttle control procedure), together with a control procedure of the variable lift amount mechanism 42 (a variable lift amount control procedure). An intake air amount GA becomes larger as the throttle opening degree, as well as the lift amount of the intake valve 30, becomes larger. Therefore, if the lift amount of the intake valve 30 is set to a relatively high level, the throttle opening degree is set to a relatively low level. Contrastingly, if the lift amount of the intake valve 30 is set to a relatively low level, the throttle opening degree is set to a relatively high level. In this manner, the intake air amount GA is adjusted to a desired level through the throttle control procedure and the variable lift amount control procedure.

The engine 10 includes various sensors for detecting the operational state of the engine 10.

The sensors include, for example, a throttle sensor 50 for detecting the throttle opening degree, an intake air amount sensor 52 for detecting the intake air amount GA in the intake passage 12, a coolant temperature sensor 54 for detecting the temperature of the engine coolant (coolant temperature THW), and an accelerator sensor 56 for detecting the position of an accelerator pedal (not shown). Further, a crank sensor 58 for detecting the rotation angle (the crank angle) and the rotation speed of the crankshaft 26, a cam sensor 60 for detecting the rotation angle (the cam angle) of the intake camshaft 34, a lift sensor 62 for detecting the lift duration angle VL of the intake valve 30 (more specifically, the actuation amount of the variable lift amount mechanism 42) are provided.

The engine 10 also includes an electronic control unit 70 having, for example, a microcomputer. The electronic control unit 70 receives detection signals from the sensors and performs computations. In correspondence with the results of the computations, the electronic control unit 70 executes various control procedures for the engine 10, such as the throttle control procedure, a fuel injection control procedure, a control procedure of the variable valve timing mechanism 38, and the variable lift amount control procedure.

As one of the control procedures for the engine 10, the electronic control unit 70 performs an ISC (idle speed control) procedure.

The ISC procedure is carried out as the throttle control procedure. More specifically, in an idle state of the engine 10, the throttle opening degree is feedforward controlled in correspondence with the engine operation state. Meanwhile, in order to adjust the actual engine speed NE to a target engine speed Tne, the throttle opening degree is controlled in a feedback manner in correspondence with the difference between actual engine speed NE and the target engine speed Tne. In the first embodiment, the ISC control procedure corresponds to a procedure performed by a control section for adjusting and controlling the intake air amount in such a manner that the actual engine speed becomes the target engine speed. Further, the throttle opening degree corresponds to a control amount related to operation of the control section.

In addition to the ISC control procedure, the variable lift amount control procedure is performed for setting the lift amount in correspondence with the engine operation state. The amount of the intake air fed to the combustion chamber 18 is thus adjusted by the variable lift amount control procedure and the ISC control procedure. In the first embodiment, the lift amount of the intake valve 30 is set to a relatively small level when warm-up of the engine is complete, compared to when the warm-up is incomplete.

The ISC procedure will hereafter be explained in detail with reference to the flowchart of FIG. 4. The procedure of FIG. 4 is executed by the electronic control unit 70 at predetermined intervals.

Figure 4:
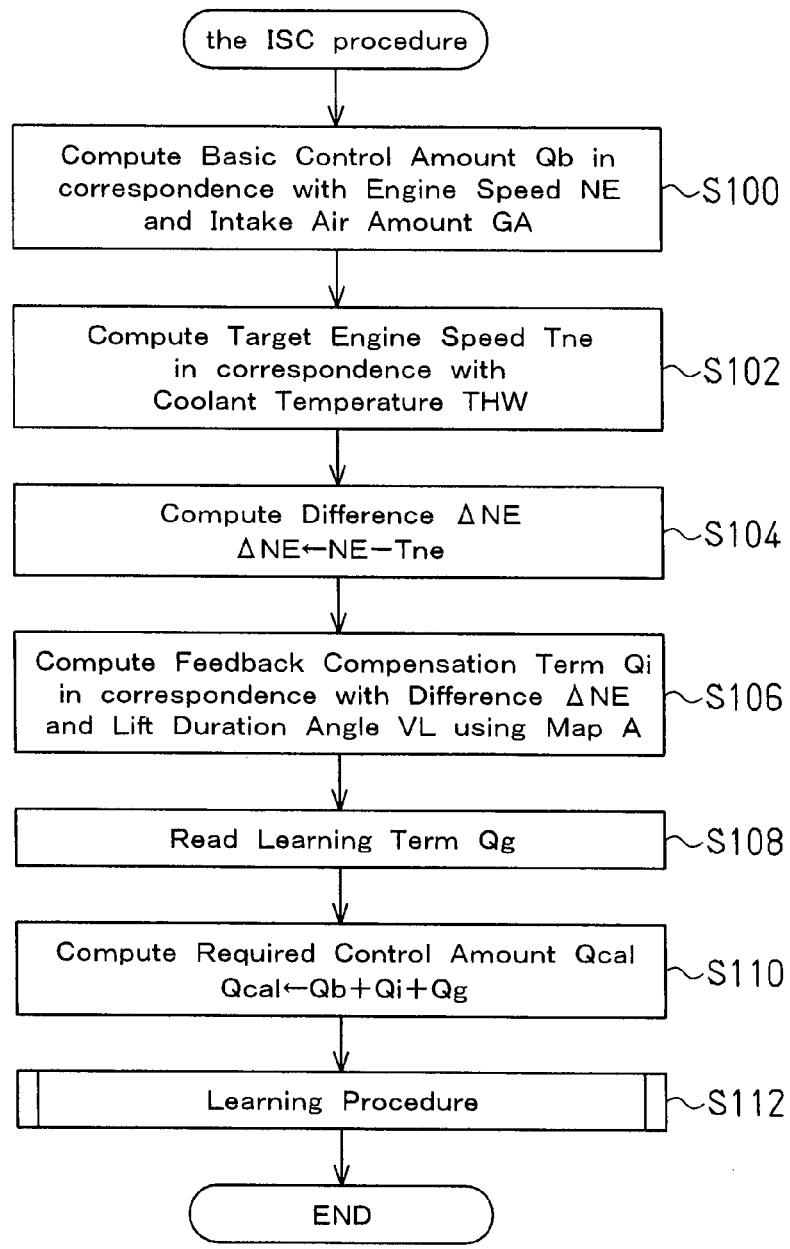
FIG. 4 is a flowchart of an ISC procedure of the first embodiment.

Referring to FIG. 4, the basic control amount Qb, or a basic value for a required control amount Qcal, which will be described later, is determined in correspondence with the actual engine speed NE and the intake air amount GA (in step S100). The obtained the basic control amount Qb is outputted as a control signal for the throttle valve 14, or, more specifically, the throttle motor 16. As the basic control amount Qb becomes larger, the throttle opening degree becomes larger, as well as the intake air amount GA. The fuel injection amount increases correspondingly, thus raising actual engine speed NE. The same consequences as those of the basic control amount Qb are brought about by a feedback compensation term Qi and the required control amount Qcal, which will be explained later.

Subsequently, the target engine speed Tne for actual engine speed NE is computed in correspondence with the coolant temperature THW (in step S102). As the coolant temperature THW becomes lower, the engine operation state becomes more unstable. For avoiding this, the target engine speed Tne is set to a relatively high level when the coolant temperature THW is relatively low.

A difference ΔNE between the actual engine speed NE and the target engine speed Tne (=NE−Tne) is then obtained (in step S104). In correspondence with the difference ΔNE and the lift duration angle VL set in the variable lift amount control procedure, the feedback compensation term Qi is determined (in step S106). More specifically, the feedback compensation term Qi is obtained by adding a compensation term proportional to an integral of the difference ΔNE (integral term Qfbi) to a compensation term proportional to the difference ΔNE (proportional term Qfbp). The proportional term Qfbp and the integral term Qfbi, are each computed as follows.

First, a computation procedure of the proportional term Qfbp will be explained.

If the actual engine speed NE is lower than the target engine speed Tne (difference ΔNE<0), the proportional term Qfbp is obtained as a positive value that becomes larger as the difference between actual engine speed NE and the target engine speed Tne (=|NE−Tne|) becomes greater. In contrast, if the actual engine speed NE is higher than the target engine speed Tne (difference ΔNE>0), the proportional term Qfbp is determined as a negative value that becomes smaller as the difference between actual engine speed NE and the target engine speed Tne (=|NE−Tne|) becomes greater. Further, if the actual engine speed NE and the target engine speed Tne are equal (difference ΔNE=0), the proportional term Qfbp is computed to be zero. In correspondence with the obtained proportional term Qfbp, the feedback compensation amount is set to a relatively large value when the difference between the actual engine speed NE and the target engine speed Tne is relatively great. The throttle opening degree is thus quickly altered.

Figure 5:
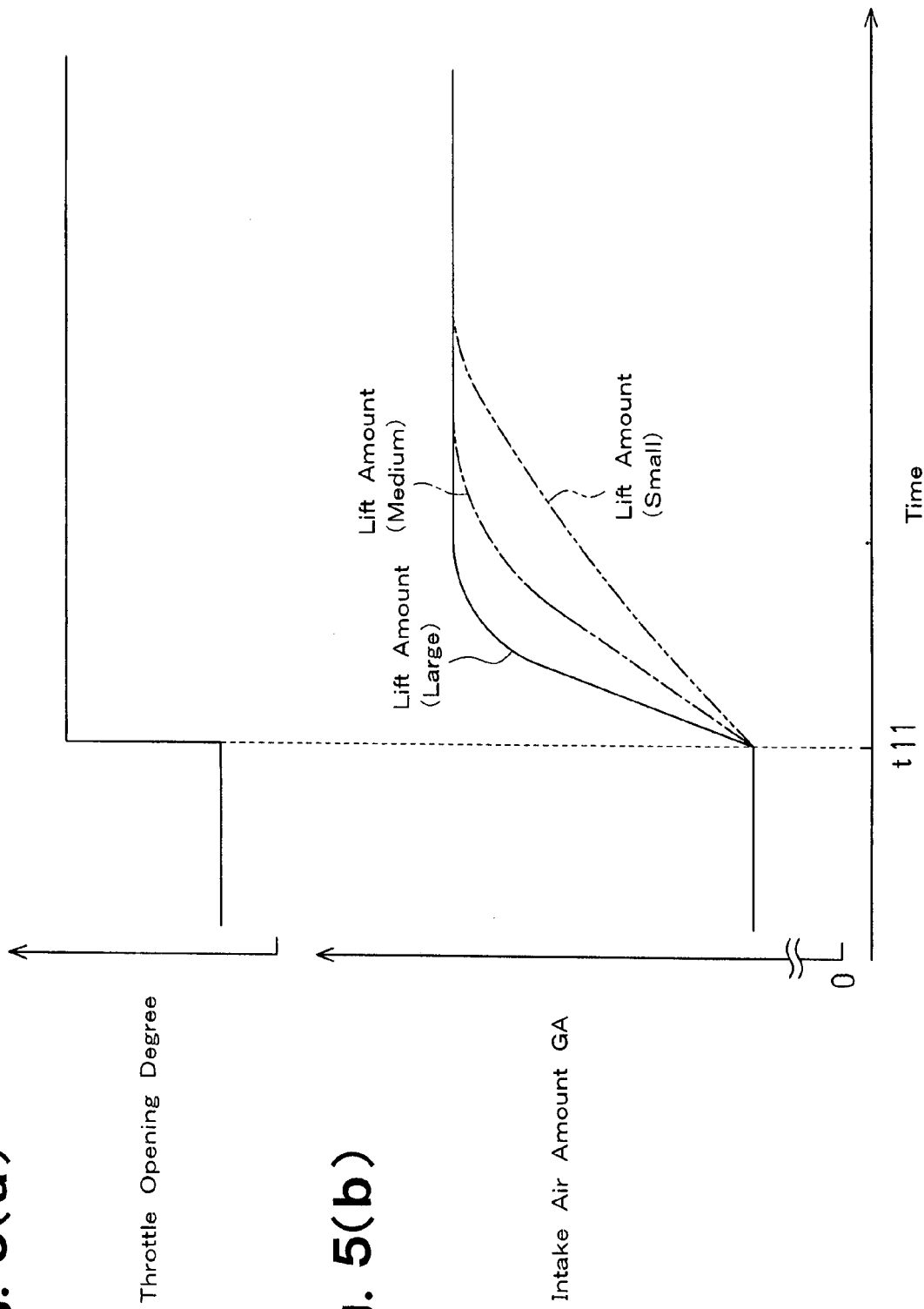
FIGS. 5(a) and 5(b) are timing charts representing relationship between lift duration angle of an intake valve and intake air amount.

If the lift amount of the intake valve 30 is set to a relatively small value in the variable lift amount control procedure, it is indicated that a restrictor is provided between the intake valve 30 and the corresponding valve seat for restricting the flow of the intake air. In FIGS. 5(a) and 5(b), the throttle opening (FIG. 5(a)) is switched (at time t11) in multiple cases in which the settings other than the lift amount are equal. Generally, if the lift amount is set to a relatively small value (the case indicated by the chain double-dashed line), a relatively long delay is caused in the change of the intake air amount GA (FIG. 5(b)) after the change of the throttle opening degree, compared to the case in which the lift amount is set to a relatively large value (corresponding to the curve indicated by the solid line). The delay varies the response of the intake air amount GA with respect to changes of the throttle opening degree, leading to variation in the speed at which the actual engine speed NE changes in response to the ISC.

Figure 6:
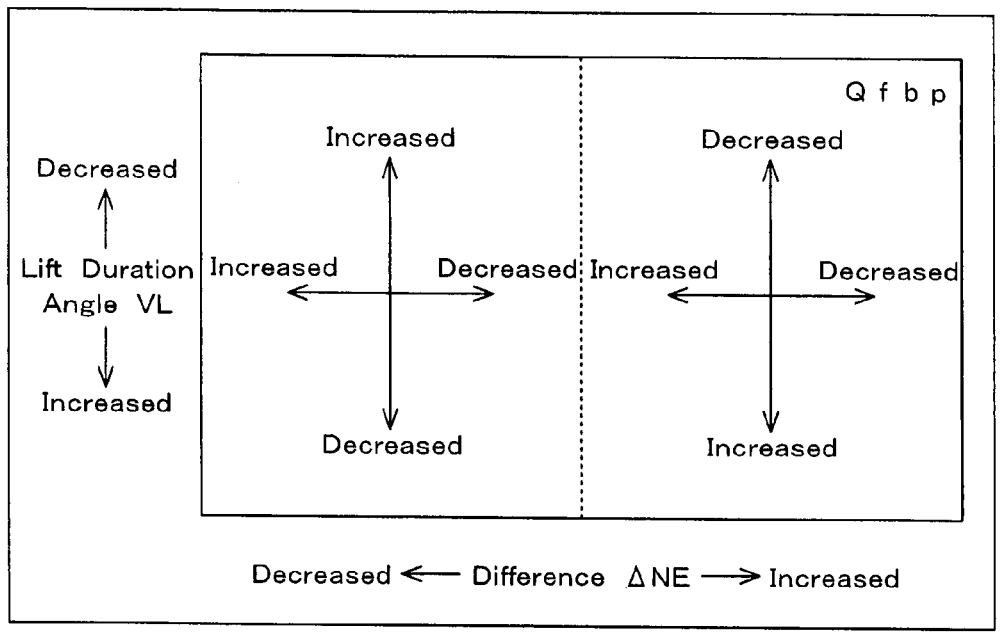
FIG. 6 is a view schematically showing map A used in the procedure of FIG. 4 for computing a proportional of a feedback compensation term Qi.

In order to solve this problem, the lift amount (more specifically, the maximum lift amount) of the intake valve 30 is used as an additional parameter for computing a proportional term Qfb, other than the difference ΔNE. Further, a feedback gain is variably set in such a manner that the feedback gain becomes greater as the lift amount becomes smaller. More specifically, the lift duration angle VL, or an indicator value of the lift amount of the intake valve 30, is used as the lift amount. FIG. 6 shows a map used in computation of the proportional term Qfbp (hereinafter, "map A"). As indicated by map A, if the difference ΔNE is negative, the proportional term Qfbp is obtained as a positive value that becomes greater as the lift duration angle VL becomes smaller. In contrast, if the difference ΔNE is positive, the proportional term Qfbp is obtained as a negative value that becomes smaller as the lift duration angle VL becomes smaller.

In this manner, the feedback compensation amount becomes larger as the lift duration angle VL becomes smaller. The throttle opening degree thus quickly changes, and, correspondingly, the amount of the intake air fed to the combustion chamber 18 changes rapidly. This improves the response of the actual engine speed NE, when the actual engine speed NE is adjusted to the target engine speed Tne in the engine idle state. Further, in the first embodiment, the feedback compensation amount is set in correspondence with the difference ΔNE, unlike a case in which the feedback compensation amount is compensated simply by adding or subtracting an amount corresponding to the lift amount with respect to the feedback compensation amount, without referring to the difference ΔNE. Accordingly, in this embodiment, the actual engine speed NE is controlled with respect to the target engine speed Tne further appropriately in the engine idle state.

In this manner, the actual engine speed NE in the engine idle state is controlled effectively in correspondence with the lift amount changed by the variable lift amount mechanism 42.

Next, a computation procedure of the integral term Qfbi will be explained.

The integral term Qfbi is initially set to zero and updated when necessary, depending on whether or not the actual engine speed NE is higher than the target engine speed Tne. More specifically, if the actual engine speed NE is higher than the target engine speed Tne, a predetermined value ΔA is added to the integral term Qfbi (Qfbi←Qfbi+ΔA). In contrast, if the actual engine speed NE is not higher than the target engine speed Tne, the value ΔA is subtracted from the integral term Qfbi (Qfbi←Qfbi−ΔA).

In this manner, the feedback compensation term Qi (=proportional term Qfbp+integral term Qfbi) is computed. Afterwards, a learning term Qg is read (in step S108).

Figure 7:
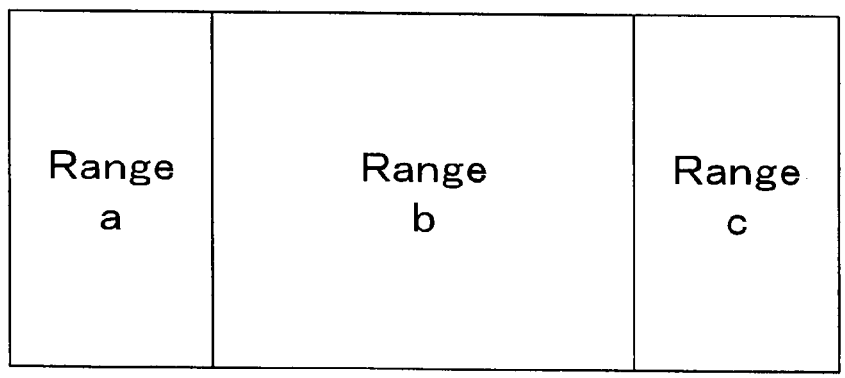
FIG. 7 is a diagram schematically showing a plurality of learning ranges each defined in correspondence with the lift duration angle, which are used in the procedure of FIG. 4.

As shown by the diagram of FIG. 7, the learning term Qg is set in accordance with a plurality of (in this embodiment, three) ranges defined in correspondence with the intake air amount GA (more specifically, the lift duration angle VL). The learning term Qg is learned as will be described later and stored in the electronic control unit 70. In step S108, a current learning range is selected in correspondence with the lift duration angle VL and the learning term Qg corresponding to the selected range is obtained.

Subsequently, the required control amount Qcal is computed in correspondence with the basic control amount Qb, the feedback compensation term Qi, and the learning term Qg, using the following equation:

$$Qcal=Qb+Qi+Qg$$

The learning term Qg is then subjected to a learning procedure (in step 112). In the first embodiment, the procedure of step 112 corresponds to a procedure performed by a learning section for learning a constant difference between the feedback compensation amount and a corresponding reference value as a feedforward compensation amount. Further, the compensation amount determined by the learning term Qg corresponds to the feedforward compensation amount learned by the learning section.

Figure 8:
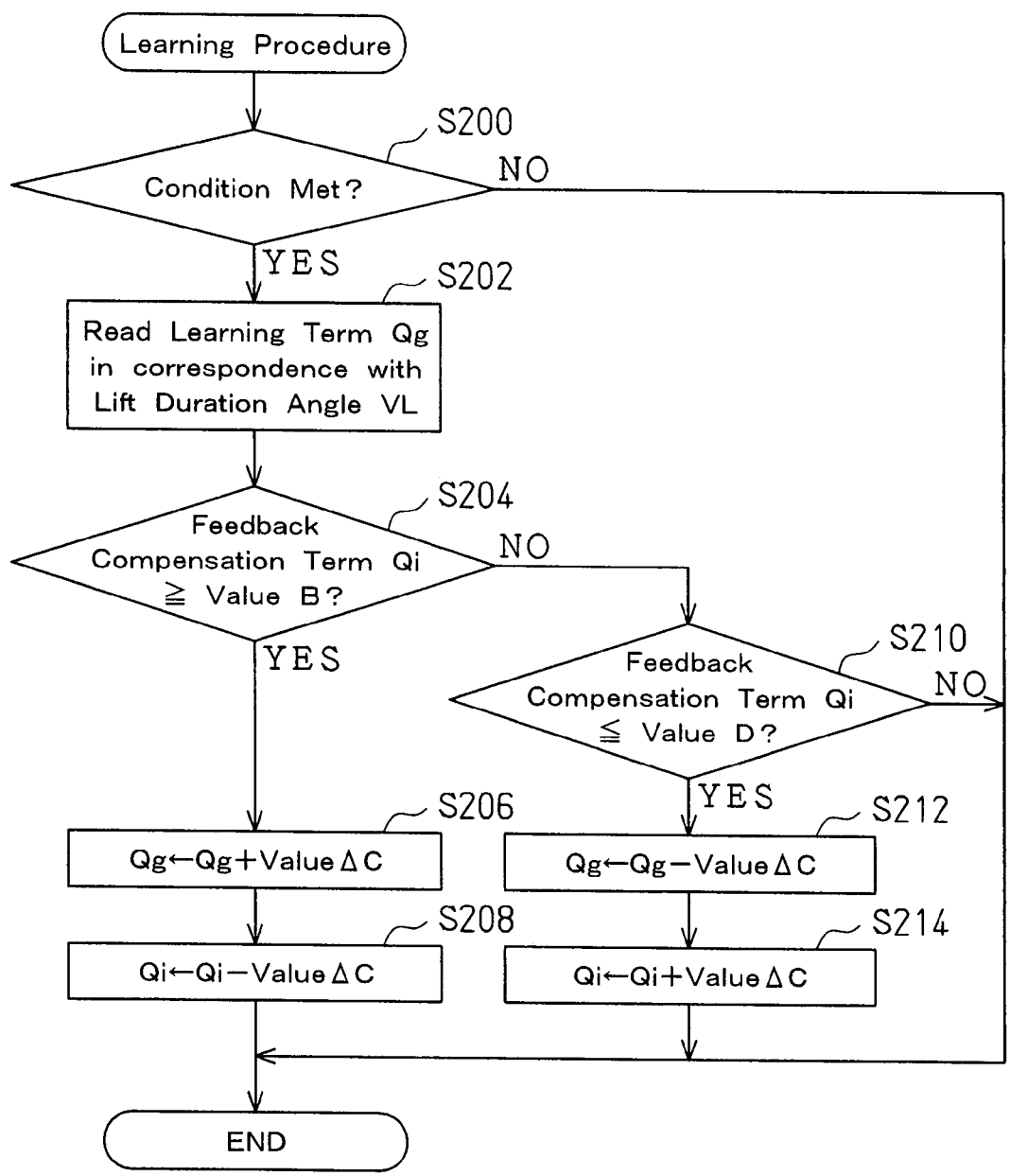
FIG. 8 is a flowchart of a learning procedure of the first embodiment.
Figure 9A:
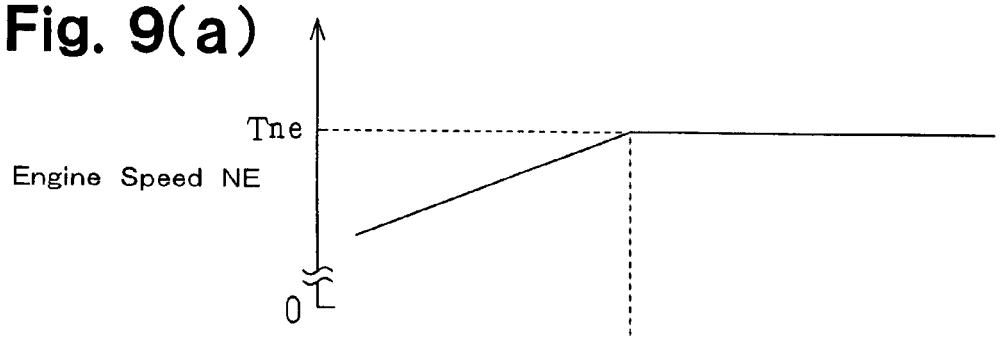
FIG. 9 is a timing chart representing an example of the learning procedure of FIG. 8.
Figure 9B:
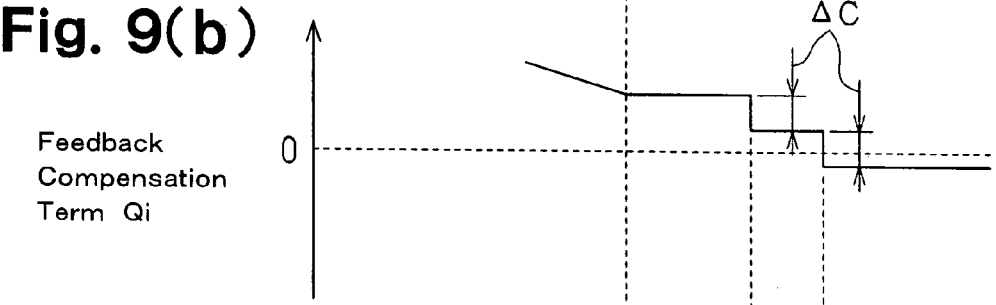
Figure 9C:
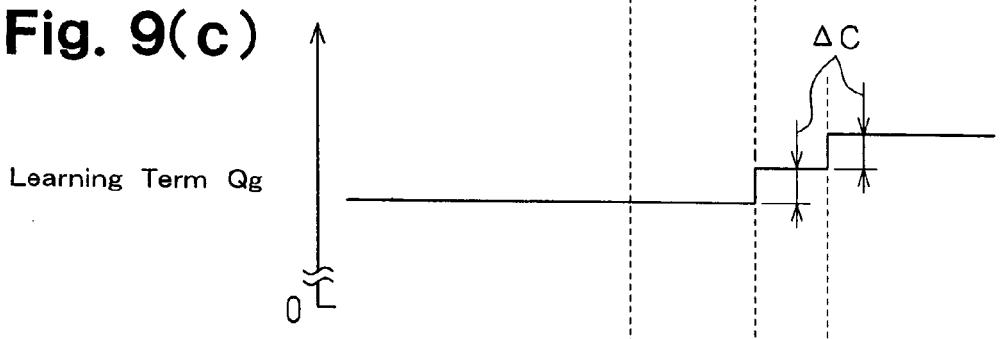
Figure 9D:
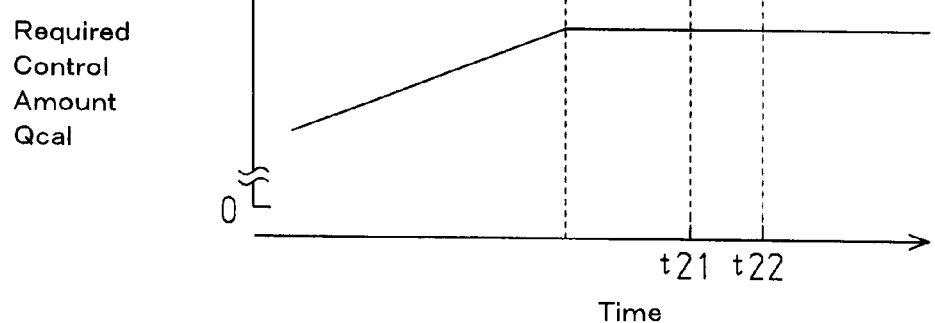

The learning procedure will now be explained with reference to FIGS. 8 and 9. FIG. 8 is a flowchart of the learning procedure and FIG. 9 is a timing chart representing an example of the learning procedure.

First in the learning procedure, it is determined whether or not a condition for starting the procedure is satisfied (in step 200 of FIG. 8). More specifically, if the actual engine speed NE has been maintained substantially constant for a predetermined time and the accelerator pedal has been free from depression for a predetermined time, it is determined that the condition is met.

If the condition is not satisfied (NO in step S200), the learning procedure is suspended without proceeding to the following steps.

Contrastingly, if the condition is met (YES in step S200), a learning range corresponding to a current value of the lift duration angle VL is selected and the learning term Qg is read in correspondence with the selected range (in step S202).

If the feedback compensation term Qi is equal to or greater than a predetermined value B (YES in step S204), a predetermined value ΔC is added to the learning term Qg (in step S206 of FIG. 8), like at times t21, t22 of FIG. 9. Further, for avoiding a rise of the actual engine speed NE due to an increase of the learning term Qg, the value ΔC is subtracted from the feedback compensation term Qi (in step 208), when the learning term Qg is updated (increased).

Contrastingly, if the feedback compensation term Qi is smaller than value B (NO in step S204), it is further determined whether or not the feedback compensation term Qi is equal to or smaller than a predetermined value D (value B>value D) in step S210.

If the feedback compensation term Qi is equal to or smaller than the value D (YES in step S210), the value ΔC is subtracted from the learning term Qg (in step S212) and added to the feedback compensation term Qi (in step 214).

If the feedback compensation term Qi is smaller than value B but greater than the value D (NO in step S204 and NO in step S210), the learning term Qg is maintained without being updated.

Accordingly, the constant difference between the feedback compensation term Qi and the corresponding reference value (in the first embodiment, zero) is reliably compensated using the learning term Qg, which is updated or maintained in the above-described manner.

However, if the throttle valve 14 or the variable lift amount mechanism 42 includes product errors, the throttle opening degree or the lift amount cannot coincide with, or is constantly different from, the corresponding target value. In this case, the feedback compensation term Qi is constantly different from the corresponding reference value, in correspondence with the constant difference between the throttle opening degree or the lift amount and the corresponding target value.

In the first embodiment, such constant difference is compensated for (canceled) by using the learning term Qg. Therefore, feedback controlling of the ISC procedure is reliably performed, without being affected by the product errors of the throttle valve 14 or the variable lift amount mechanism 42. In other words, the constant difference between the actual engine speed NE and the target engine speed Tne caused by unexpected external factors is reliably canceled. The throttle opening degree is thus further appropriately feedback controlled.

Figure 10:
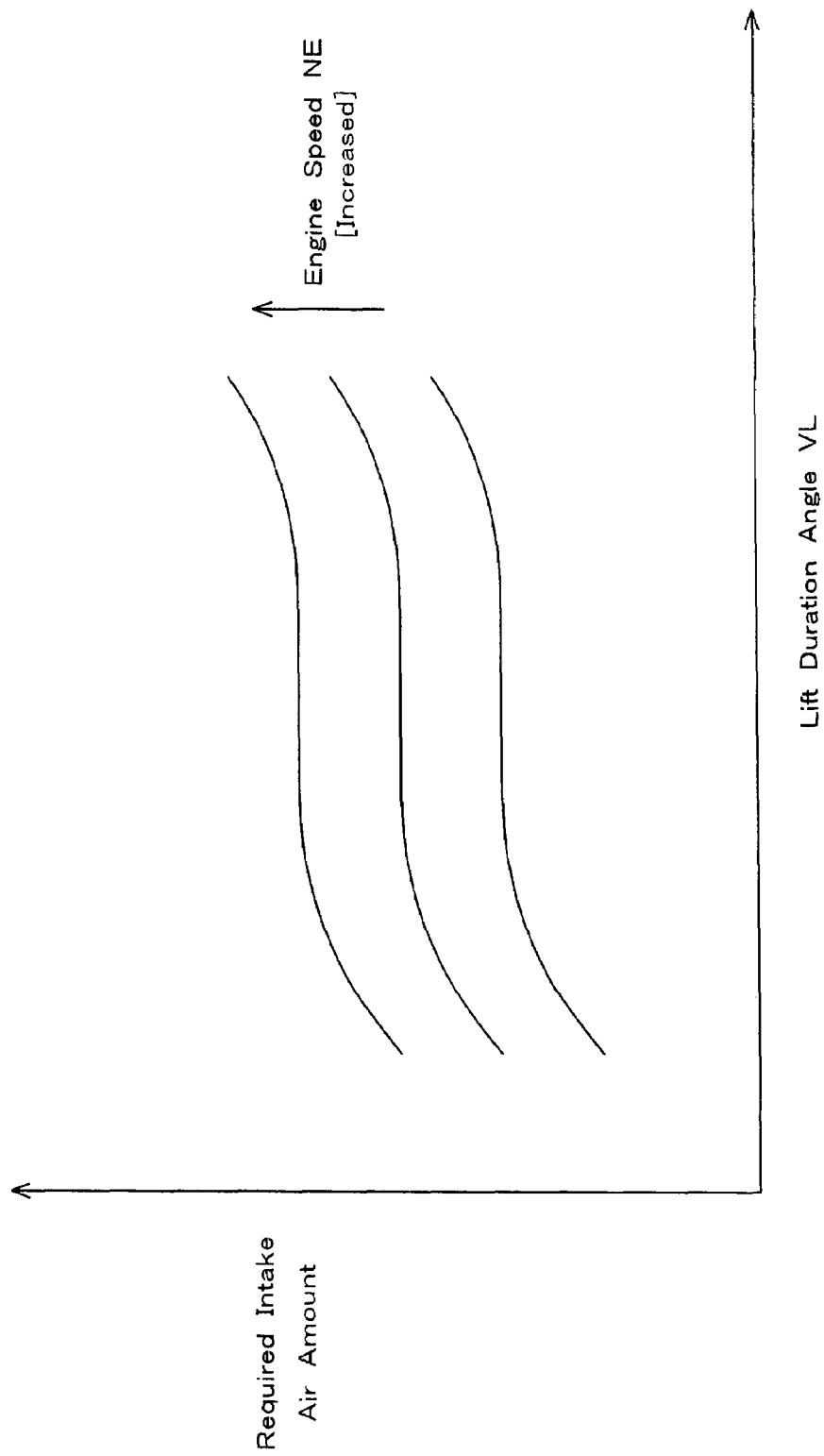
FIG. 10 is a graph representing the relationship between the lift duration angle and a required intake air amount.

Further, as has been described, the engine is allowed to operate at a relatively low output (a relatively low air amount) if the intake air amount GA is adjusted by changing the lift amount of the intake valve 30, compared to a case in which such adjustment is carried out by, for example, changing the throttle opening degree. Therefore, in general, as the opening degree of the throttle valve 14 becomes smaller, or the lift amount (lift duration angle VL) set in the variable lift amount control procedure becomes larger, engine output (intake air amount GA) required for adjusting the actual engine speed NE to the target engine speed Tne becomes greater, as shown by FIG. 10.

In the variable lift amount control procedure of the first embodiment, the lift duration angle VL of the intake valve 30 is set to a relatively small value when warm-up of the engine is complete, compared to when the warm-up is incomplete. Therefore, on completion of the warm-up, the lift duration angle VL of the intake valve 30 starts to decrease and, correspondingly, the engine output required for adjusting the actual engine speed NE to the target engine speed Tne also starts to decrease. Further, the influence of the constant difference between the actual engine speed NE and the target engine speed Tne on the ISC is inconstant. That is, generally, the influence of such difference on the ISC becomes smaller as the intake air amount GA becomes smaller.

When the warm-up is complete and the lift duration angle VL decreases, the required engine output decreases or the influence of the aforementioned difference on the ISC also becomes smaller. This may lead to an unnecessary rise of the actual engine speed NE or a rapid decrease of the feedback compensation term Qi, which occurs for suppressing the increase of the actual engine speed NE.

Figure 11:
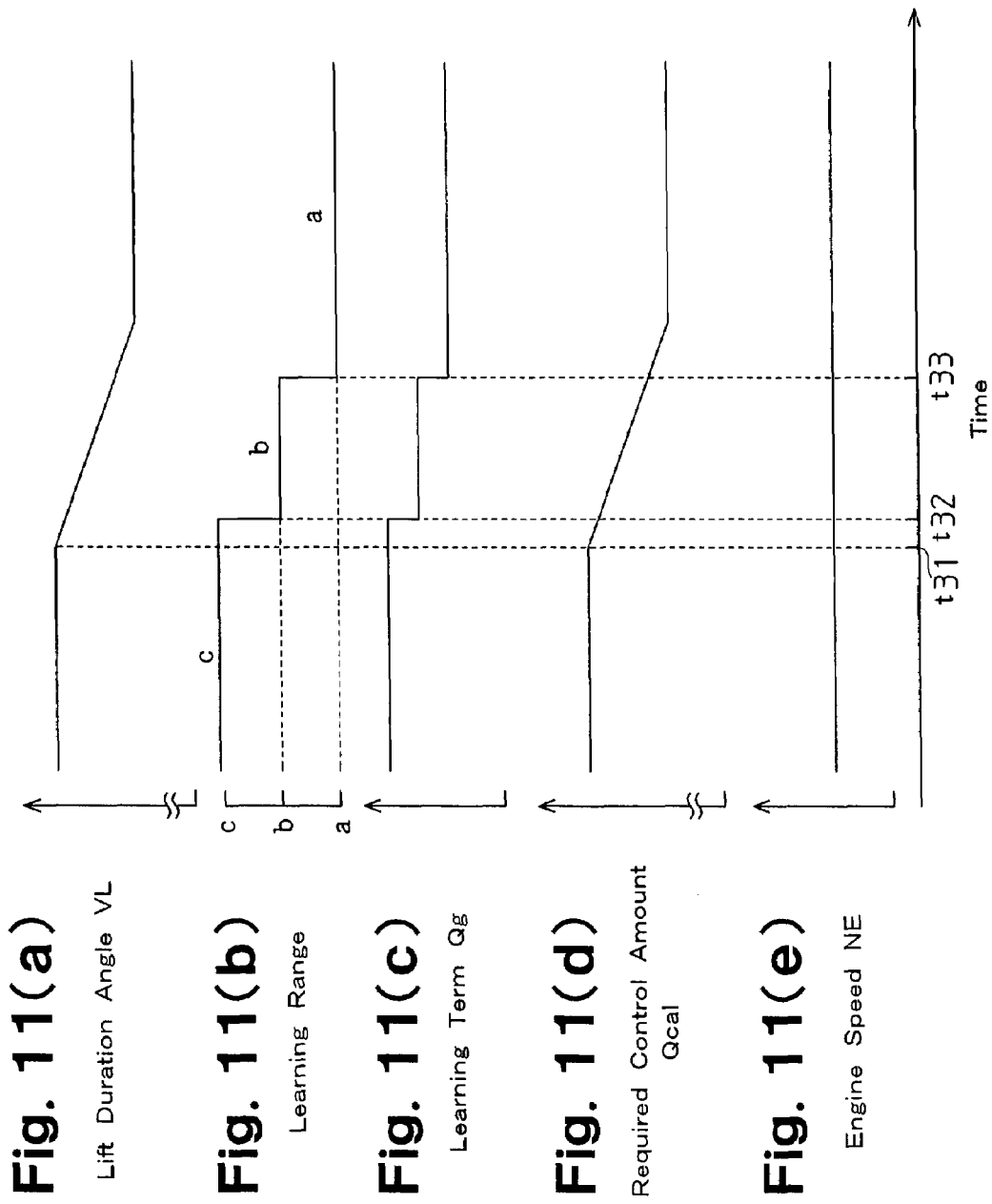
FIGS. 11(a) to 11(e) are timing charts representing an example of the ISC procedure of FIG. 4.

However, in the first embodiment, the multiple ranges are defined for the lift duration angle VL of the intake valve 30. The learning term Qg is thus learned in accordance with each of the ranges, in correspondence with the required engine output or the influence of the aforementioned difference. Therefore, as shown by FIG. 11, when the warm-up is complete (at time t31) and the lift duration angle VL (FIG. 11(a))

starts to decrease, the range for learning is successively switched from one to another (FIG. 11(b)). That is, region c switches to region b at time t32 and region b switches to region a at time t33. The learning term Qg (FIG. 11(c)) decreases each time one region switches to another. Accordingly, the required control amount Qcal (FIG. 11(d)) decreases as the required engine output decreases or the influence of the aforementioned difference on the ISC becomes smaller. This suppresses the unnecessary rise of the actual engine speed NE (FIG. 11(e)).

In this manner, in the first embodiment, the learning term Qg is set to a value suitable for ensuring the required engine output in each of ranges a to c or eliminating the influence of the constant difference between the actual engine speed NE and the target engine speed Tne on the ISC. Accordingly, compared to a case in which the learning term Qg is set to a constant value regardless of the lift duration angle VL, the feedback control is performed further appropriately in the first embodiment.

The first embodiment has the following advantages.

(1) As the parameters for computing the feedback compensation term Qi, the lift duration angle VL of the intake valve 30 is employed in addition to the difference ΔNE between the actual engine speed NE and the target engine speed Tne. Therefore, the actual engine speed NE is controlled in correspondence with the lift amount of the intake valve 30 changed by the variable lift amount mechanism 42. The actual engine speed NE is thus effectively controlled in the idle state.

(2) As the lift duration angle VL becomes smaller, the feedback compensation amount (Qi) becomes larger. Thus, even if the lift amount of the intake valve 30 is set to a relatively small value by the variable lift amount procedure, the amount of the air fed to the combustion chamber 18 rapidly changes. This improves the control response when the actual engine speed NE is adjusted to the target engine speed Tne in the idle state.

(3) The feedback gain is set variably in such a manner that the feedback gain becomes greater as the lift duration angle VL becomes smaller. Therefore, the actual engine speed NE in the idle state is controlled further appropriately.

(4) The constant difference between the feedback compensation term Qi and the corresponding reference value is learned as the learning term Qg. The throttle opening degree is controlled in correspondence with the learning term Qg. Therefore, the feedback control is effectively performed without being affected by the product errors of the throttle valve 14 or the variable lift amount mechanism 42. In other words, the constant difference between the actual engine speed NE and the target engine speed Tne caused by unexpected external factors is eliminated. The throttle opening degree is thus further appropriately feedback controlled.

(5) The multiple ranges a to c are defined for lift operation angle VL. The learning term Qg is learned in correspondence with each range a to c. Accordingly, compared to a case in which the learning amount is set to a constant value, the feedback control is performed further appropriately.

An engine idle speed control apparatus according to a second embodiment of the present invention will hereafter be described.

The apparatus of the second embodiment is different from the apparatus of the first embodiment in terms of the ISC procedure. That is, in the first embodiment, the feedback compensation term Qi is set variably in correspondence with the lift duration angle VL of the intake valve 30. However, in the second embodiment, a feedforward compensation amount for feedforward controlling the throttle opening degree is set variably in correspondence with the lift duration angle VL of the intake valve 30.

As has been described, the lift duration angle VL of the intake valve 30 is set to a relatively small value when the engine warm-up is complete, compared to when the warm-up is incomplete. Thus, on completion of the warm-up, the lift duration angle VL starts to decrease and, correspondingly, the required engine output also starts to decrease. This may hamper the ISC in terms of control performance for the actual engine speed NE. Also, an unnecessary rise of the actual engine speed NE may be brought about.

In order to solve these problems, in the ISC procedure of the second embodiment, the basic control amount Qb is compensated in such a manner that the required control amount Qcal becomes smaller as the lift amount set by the variable lift amount control procedure becomes smaller.

The ISC procedure of the second embodiment will now be explained in detail.

Figure 12:
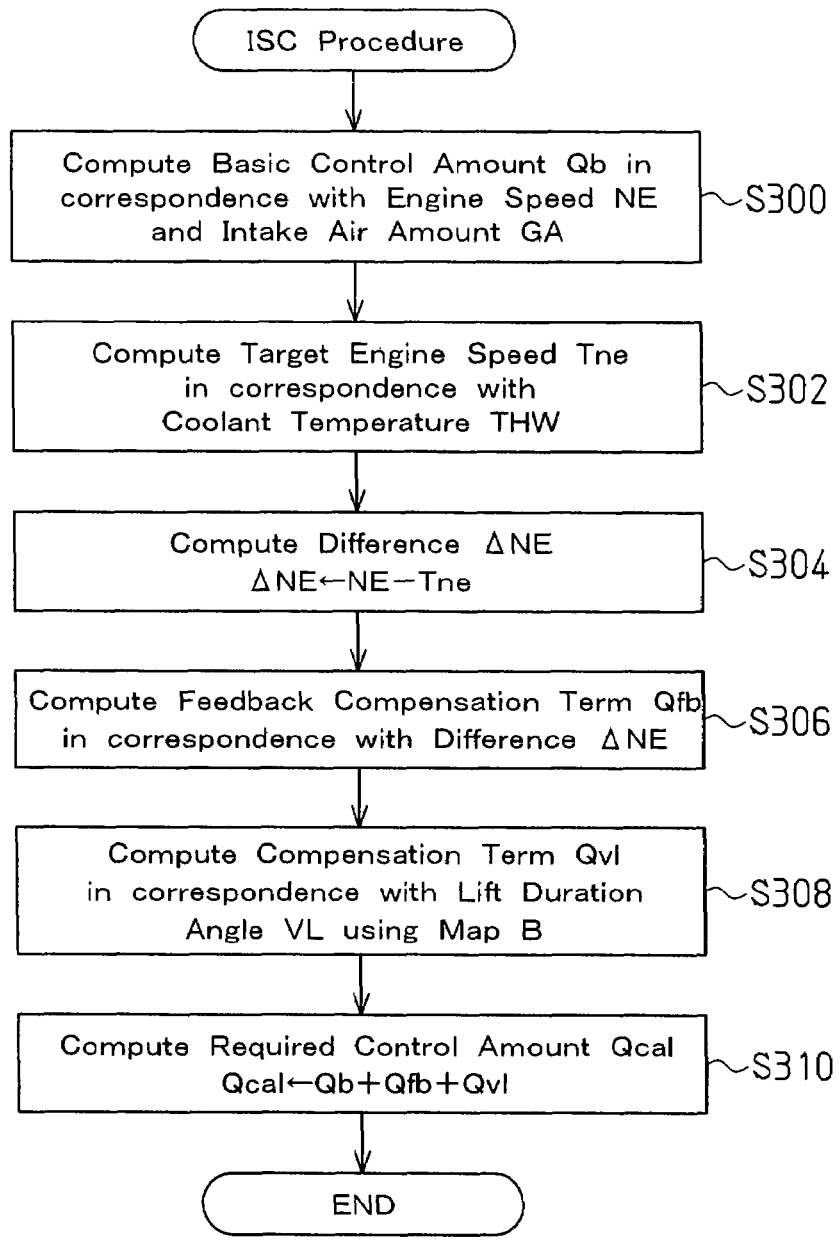
FIG. 12 is a flowchart of an ISC procedure according to a second embodiment of the present invention.

FIG. 12 is a flowchart of the ISC procedure executed by the electronic control unit 70 at predetermined intervals.

As shown in FIG. 12, first in the procedure, the basic control amount Qb, which is a basic value for the required control amount Qcal, is computed in correspondence with the actual engine speed NE and the intake air amount GA (in step S300). The basic control amount Qb is outputted as a control signal for the throttle valve 14 (more specifically, the throttle motor 16). As the basic control amount Qb becomes greater, the throttle opening degree becomes greater, as well as the intake air amount GA. Further, the fuel injection amount correspondingly increases, thus raising the actual engine speed NE. The same consequences as those of the basic control amount Qb are brought about by a feedback compensation term Qfb, a compensation term Qvl, and the required control amount Qcal, which will be explained later.

Next, the target engine speed Tne is computed for the actual engine speed NE in correspondence with the coolant temperature THW (in step S302). As the coolant temperature THW becomes lower, the engine combustion state becomes more unstable. For avoiding this, the target engine speed Tne is set to a relatively high value when coolant temperature is relatively low.

The difference ΔNE (=NE−Tne) between the actual engine speed NE and the target engine speed Tne is then obtained (in step S304). In correspondence with the obtained value, the feedback compensation term Qfb is determined (in step S306). More specifically, a compensation term proportional to the difference ΔNE and a compensation term proportional to an integral of the difference ΔNE are determined. The obtained compensation terms are added together and defined as the feedback compensation term Qfb.

Subsequently, the compensation term Qvl is computed using a map defined in correspondence with the lift duration angle VL of the intake valve 30 (hereinafter, map B) in step S308.

Figure 13:
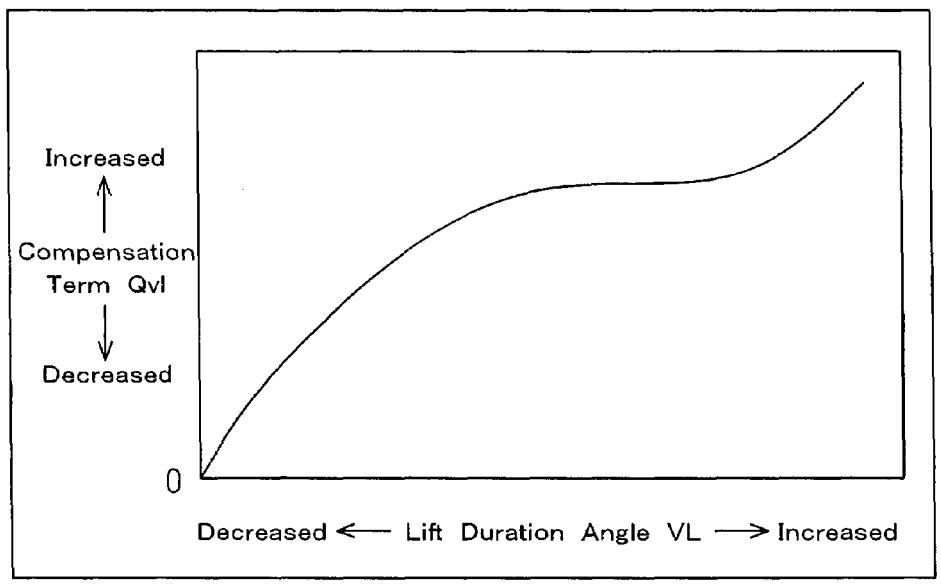
FIG. 13 is a view schematically showing map B used in the procedure of FIG. 12 for computing a compensation term of the feedback compensation term Qi.

The compensation term Qvl is used for compensating the basic control amount Qb in correspondence with the lift duration angle VL. FIG. 13 represents map B for obtaining the compensation term Qvl. As the lift duration angle VL becomes greater, the compensation term Qvl becomes larger. When the lift duration angle VL corresponds to a minimum value, the compensation term Qvl is determined to be zero. In this case, the basic control amount Qb is not compensated. In other words, in the second embodiment, by using the minimum value of the lift duration angle VL as a reference value, the basic control amount Qb is compensated to become larger (is increased) as lift duration angle becomes greater. In this embodiment, the compensation amount corresponding to the compensation term Qvl corresponds to a feedforward compensation amount used for feedforward controlling the throttle opening degree.

Next, the required control amount Qcal is computed in correspondence with the feedback compensation term Qfb and the compensation term Qvl, using the following equation (in step S310):

$$Qcal=Qb+Qfb+Qvl$$

After the required control amount Qcal is obtained, the ISC procedure is suspended.

FIG. 14 shows an example of the ISC procedure when the engine warm-up is complete.

Figure 14A:
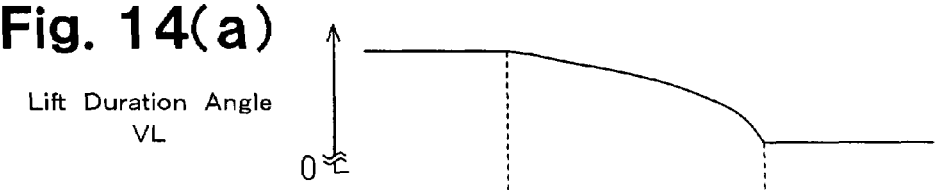
FIGS. 14(a) to 14(d) are timing charts representing an example of the ISC procedure of FIG. 12.

As shown in FIG. 14, when the warm-up is completed at time t41, the lift duration angle VL of the intake valve 30 (FIG. 14(a)) starts to decrease. Correspondingly, the required engine output, or the required intake air amount GA, decreases.

Figure 14B:
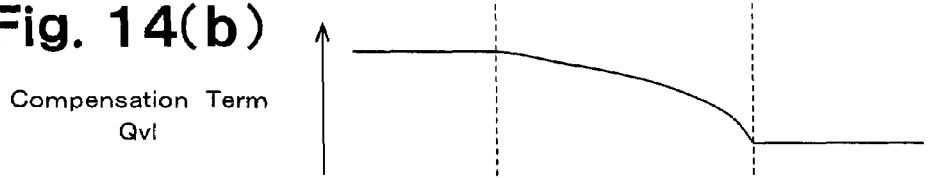
Figure 14C:
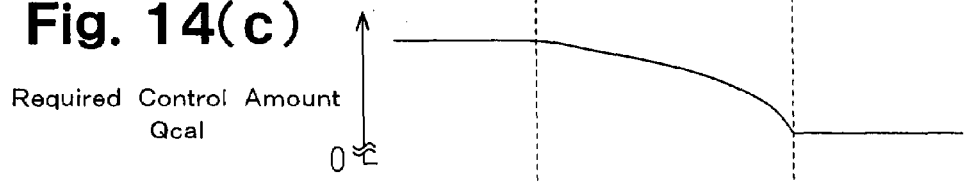
Figure 14D:
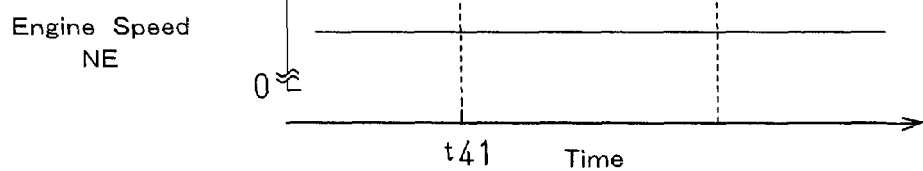

In the second embodiment, as the lift duration angle VL becomes smaller, the compensation term Qvl (FIG. 14(b)) becomes smaller. The basic control amount Qb is compensated in correspondence with the compensation term Qvl. Therefore, the basic control amount Qb, as well as the required control amount Qcal (FIG. 14(c)), is compensated in correspondence with the required intake air amount GA. That is, the actual engine speed NE (FIG. 14(d)) in the idle state is appropriately feedforward controlled. Accordingly, the actual engine speed NE in the idle state is effectively controlled in correspondence with the lift amount of the intake valve 30 changed by the variable lift amount control procedure.

The second embodiment has the following advantages.

(1) The compensation term Qvl for the basic compensation term Qb is obtained in correspondence with the lift duration angle VL of the intake valve 30, which is changed by the variable lift amount control procedure. Therefore, regardless of changes of the lift duration angle VL, the throttle opening degree is feedforward controlled in correspondence with the lift duration angle VL. Accordingly, the actual engine speed NE in the idle state is effectively controlled in correspondence with the changes of the lift duration angle VL.

(2) As the lift duration angle VL becomes larger, the compensation term Qvl becomes greater. Thus, the compensation term Qvl is set in correspondence with the required intake air amount GA. Therefore, the engine speed in the idle state is further effectively feedforward controlled.

The invention may be embodied in the following forms.

In the first embodiment, the feedback compensation term Qi is obtained with reference to map A, in correspondence with the difference ΔNE and the lift duration angle VL. However, the feedback compensation term Qi may be obtained in different manners. That is, a basic value of the feedback compensation term Qi is determined in correspondence with the difference ΔNE and then compensated in correspondence with the lift duration angle VL for determining the feedback compensation term Qi. In this manner, the feedback compensation amount for the feedback controlling of the throttle opening degree is set in correspondence with the difference between the actual engine speed and the target engine speed and the lift characteristics changed by the variable valve actuation mechanism.

In the learning procedure of the first embodiment, at least one of the values B, D, and ΔC may be varied in accordance with ranges a to c. That is, the value B, D, or ΔC is set to a relatively small value in the range in which the lift duration angle VL is relatively small. Since the influence of the constant difference between the actual engine speed NE and the target engine speed Tne on the ISC becomes smaller as the lift duration angle VL becomes smaller, the learning term Qg is updated effectively in accordance with each range a to c, in correspondence with the extent of such influence. Alternatively, the value ΔC may be set in correspondence with a current difference between the feedback compensation term Qi and the corresponding reference value. Further, as long as the influence of the aforementioned difference on the ISC is substantially equivalent in ranges a to c, it is unnecessary to provide the multiple ranges a to c. In other words, the computation method of the learning term Qg may be changed in any other suitable manners, as long as the obtained value reliably compensates the constant difference between the feedback compensation term Qi and the corresponding reference value.

If the constant difference between the actual engine speed NE and the target engine speed Tne is extremely small or the influence of such difference on the ISC is extremely small, the learning procedure may be omitted.

In the first embodiment, the crank angle of the intake valve 30 at which the lift amount of the intake valve 30 reaches a predetermined level corresponding to, for example, the opening or closing timing may be employed as a parameter for computing the feedback compensation term Qi, in addition to the difference ΔNE and the lift duration angle VL. The factors determining the amount of the intake air fed to the combustion chamber 18 include the movement speed of the piston 24, other than the throttle opening degree and the lift amount of the intake valve 30. The movement speed of the piston 24 is varied in accordance with the reciprocation strokes. That is, such speed becomes relatively low in the vicinity of the top dead center and that of the bottom dead center and is maximized in a period between the top and bottom dead centers. The amount of the intake air fed to the combustion chamber 18 is varied in correspondence with the movement speed of the piston 24. Therefore, if the crank angle is included in the parameters for computing the feedback compensation term Qi, the feedback compensation term Qi is determined in correspondence with the crank angle, which determines the movement speed of the piston 24. The engine speed in the idle state is further appropriately controlled.

In the second embodiment, as long as the compensation term Qvl becomes larger as the lift duration angle VL becomes greater, the compensation term Qvl may be computed in any other suitable manners.

The present invention may be embodied with the first and second embodiments combined.

In the illustrated embodiments, the lift duration angle VL is used for computation of feedback compensation term Qi (the first embodiment), definition of learning ranges a to c (the first embodiment), and computation of feedback term Qvl (the second embodiment). However, the lift duration angle VL may be replaced by any other factor of lift characteristics of the intake valve 30 indicating the lift duration angle VL, such as the opening or closing timing, the lift amount, and the relationship between the crank angle and the lift amount when the intake valve 30 is open (the lift profile of the intake valve 30).

The ISC procedure does not necessarily have to control the throttle opening degree but may control the opening degree of a control valve provided in a bypass bypassing an upstream section of the intake passage 12 from the throttle valve 14 to a downstream section.

In the illustrated embodiments, the present invention is applied to the engine in which the lift characteristics of the intake valve 30 are variably set depending on whether the engine warm-up is complete or incomplete. However, the present invention is applicable to an engine in which the lift characteristics of an intake valve are variably set in correspondence with a deposit formation state of a valve seat of the intake valve, an activation state of an electric component such as a headlight, or an actuation sate of an engine auxiliary device such as an air compressor or an alternator.

The present examples and embodiments are to be considered as illustrative and not restrictive and the invention is not to be limited to the details given herein, but may be modified within the scope and equivalence of the appended claims.

The invention claimed is:

1. An idle speed control method for an internal combustion engine including an intake passage, an intake valve, and a variable valve actuation mechanism that varies lift characteristics of the intake valve, the method comprising:
controlling an intake air amount in the intake passage of the engine in an idle state for adjusting an actual engine speed to a target engine speed,
setting a required opening degree of the intake passage in correspondence with the lift characteristics varied by the variable valve actuation mechanism, and
controlling a control valve provided on the intake valve for adjusting an actual opening degree of the intake valve.

2. The method according to claim 1, comprising feedback controlling the opening degree of the intake passage in such a manner that a feedback compensation amount for the required opening degree of the intake passage is set in correspondence with the difference between the actual engine speed and the target engine speed and the lift characteristics varied are by the variable valve actuation mechanism.

3. The method according to claim 1, comprising feedforward controlling the opening degree of the intake passage in such a manner that a feedforward compensation amount for the required opening degree of the intake passage control amount is set in correspondence with the lift characteristics varied by the variable valve actuation mechanism.

4. An idle speed control apparatus for an internal combustion engine including an intake passage, an intake valve, and a variable valve actuation mechanism that varies lift characteristics of the intake valve, the apparatus comprising: a control valve for controlling an opening degree of the intake passage, a control section for controlling the control valve to adjust an intake air amount of the engine in an idle state for adjusting an actual engine speed to a target engine speed,
wherein the control section sets a required opening degree of the intake passage in correspondence with the lift characteristics varied by the variable valve actuation mechanism.

5. The apparatus according to claim 4, wherein the control section controls a throttle opening degree.

6. The apparatus according to claim 4, wherein the control section feedforward controls the opening degree of the intake passage in such a manner that a feedforward compensation amount for the required opening degree of the intake passage is set in correspondence with the lift characteristics varied by the variable valve actuation mechanism.

7. The apparatus according to claim 6, wherein the variable valve actuation mechanism varies a lift duration angle of the intake valve as the lift characteristics, and wherein the feedforward compensation amount set by the control section becomes greater as the lift duration angle set by the variable valve actuation mechanism becomes larger.

8. The apparatus according to claim 4, wherein the control section feedback controls the opening degree of the intake passage in such a manner that a feedback compensation amount for the required opening degree of the intake passage is set in correspondence with the difference between the actual engine speed and the target engine speed and the lift characteristics are varied by the variable valve actuation mechanism.

9. The apparatus according to claim 8, wherein the engine has a crankshaft, and wherein the control section sets the feedback compensation amount in correspondence with the difference between the actual engine speed and the target engine speed, the lift characteristics are varied by the variable valve actuation mechanism, and a rotation angle of the crankshaft corresponds to a predetermined level of the lift amount of the intake valve.

10. The apparatus according to claim 8, wherein the variable valve actuation mechanism varies a lift amount of the intake valve as the lift characteristics, and wherein the feedback compensation amount set by the control section becomes greater as the lift amount set by the variable valve actuation mechanism becomes smaller.

11. The apparatus according to claim 10, wherein a feedback gain related to the feedback controlling set by the control section becomes greater as the lift amount becomes smaller.

12. The apparatus according to claim 8, wherein
the feedback compensation amount is different from a predetermined reference value;
the apparatus further includes a learning section for learning the difference between the feedback compensation amount and the reference value as a feedforward compensation amount; and
the control section controls the opening degree of the intake passage in correspondence with the feedback compensation amount and the feedforward compensation amount.

13. The apparatus according to claim 12, wherein the learning section defines a plurality of ranges for the intake air amount, and wherein the learning section learns the feedforward compensation amount in correspondence with each of the ranges.

* * * * *